March 29, 1966  G. M. ARTHUR  3,243,240

REINFORCED RUBBER BUSHING

Filed Jan. 28, 1963

INVENTOR.
GENE M. ARTHUR

BY *James A. Smith*

ATTORNEY

United States Patent Office 3,243,240
Patented Mar. 29, 1966

3,243,240
REINFORCED RUBBER BUSHING
Gene M. Arthur, Norwalk, Ohio, assignor to Clevite
Harris Products, Inc., a corporation of Ohio
Filed Jan. 28, 1963, Ser. No. 254,170
4 Claims. (Cl. 308—36.1)

This invention relates to rubber bushings and, particularly, to an improved low cost rubber bushing which can be readily seated in an opening or bore of a supporting structure by means of an interference fit.

Rubber bushings have been utilized extensively to resiliently support a reciprocal or rotatable shaft. Various methods have been utilized to mount said bushings on a supporting structure therefor. For example, one method is to mount the rubber part within an outer metal sleeve which is in turn force fitted within an opening of the supporting structure or suitably clamped thereon, the force fit being preferred due to the lower cost. However, even in the case of force fitting the cost is material due to close manufacturing tolerances which must be maintained with respect to the metal to metal mounting surfaces.

The most desirable method of mounting the rubber bushing would be to directly force fit the rubber part in an opening or bore of a rigid supporting structure so that the flexibility of the rubber would compensate for dimensional differences and eliminate the need for close dimensional tolerances. However, such direct mounting of the rubber part has been in the past generally unsatisfactory for reason that compression of the rubber material, as a result of the force or interference fit results in distortion of the shaft bore and thus distortion of the bearing surface, particularly in the case of elongated rubber sleeves force fitted in an opening in a thin supporting wall such as a sheet metal plate.

In the case of a rubber part directly force fitted into an opening or bore of a supporting structure distortion of the bearing surface can be prevented by the use of an inner rigid bearing sleeve in which the shaft is slidably received. This, however, similar to the use of an outer rigid sleeve increases the cost of the bushing in that parts having high dimensional tolerances are required.

It is a principal object of this invention to provide an improved rubber bushing which can be force fitted within an opening or bore of a supporting structure without the use of inner or outer sleeves.

Another object of the invention is to directly mount a rubber bushing by means of an interference fit within an opening or bore in a rigid supporting structure without producing distortion of the bearing surface.

Another object of the invention is to provide rigid reinforcement of a rubber bushing without need for maintaining close dimensional tolerances in the fabrication thereof.

Still another specific object of the invention is to provide an improved sealed shaft bushing particularly useful as a bushing for a reciprocal shaft extending through a wall of a sealed container.

In a preferred embodiment of the invention a rubber sleeve of generally cylindrical configuration is provided with a longitudinal bore adapted to receive a shaft to provide a bearing support therefor. The rubber sleeve is provided with an outside diameter exceeding that of the opening or bore of the supporting structure in which it is to be mounted whereby the sleeve may be force fitted within said opening and retained therein by frictional engagement resulting from elastic deformation of the rubber material forming the sleeve. To prevent distortion of the bore of the rubber sleeve in response to compression of the rubber material a rigid reinforcing member is embedded within the sleeve and contained therein. Since the reinforcing member does not contact the bore in which the sleeve is received or the shaft received by the sleeve it need not be fabricated to close dimensional tolerances, the resiliency of the rubber material around the reinforcing part compensating for dimensional variations.

Other objects and advantages will become apparent from the following description taken in connection with the accompanying drawings, wherein.

Figure 1:
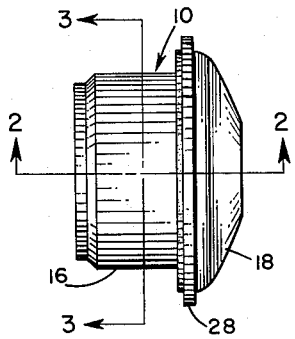
FIGURE 1 is a longitudinal view of a rubber bushing embodying the invention.
Figure 2:
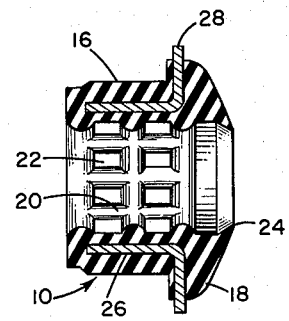
FIGURE 2 is a section taken along the line 2—2 of FIGURE 1.
Figure 3:
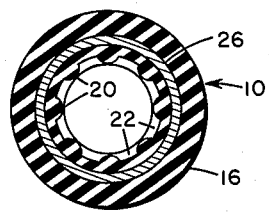
FIGURE 3 is a section taken along the line 3—3 of FIGURE 1.

Referring to the drawing there is shown a rubber bushing comprising an elongated rubber sleeve identified generally by the reference numeral 10 and adapted to be supported within an opening or bore of a supporting structure such as, for example, a circular opening 12 in a sheet metal structure 14. Specifically, the rubber sleeve 10 in the free state thereof shown in FIGURES 1, 2 and 3 comprises a cylindrical portion 16 having an outer diameter exceeding the diameter of opening 12 to be received therein by elastic deformation of the rubber material, and comprises a flange 18 at the upper end thereof adapted to engage the surface of sheet metal structure 14 around opening 12 to impart rigidity to the interference mounting of rubber sleeve 10. The flange 18 is formed integrally with portion 16 and is provided with a dome-shaped end surface to which pressure may be applied to force cylindrical portion 16 within opening 12.

Figure 4:
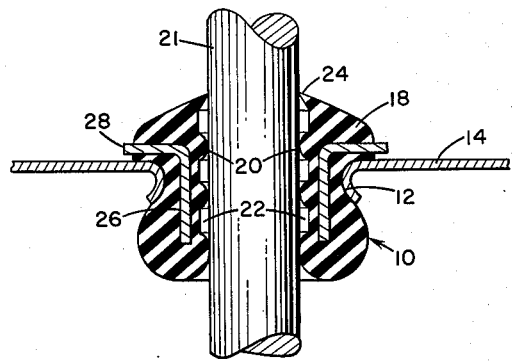
FIGURE 4 is a sectional view similar to FIGURE 2 showing the bushing mounted in an opening in a thin supporting wall and supporting a shaft.

The bore of rubber sleeve 10 is continuous through cylindrical portion 16 and flange 18 and is provided with a plurality of circumferential and longitudinal spaced raised ribs 20 on the wall thereof which are adapted to be engaged by a rotatable or reciprocal shaft such as shaft 21 illustrated in FIGURE 4 to provide bearing support therefor. The ribs 20 are thus arranged in a grid-like pattern and define a plurality of recesses or cavities 22 adjacent the peripheral surface of the supporting shaft. Prior to insertion of shaft 20 in the bore of rubber sleeve 10 the cavities 22 are filled with lubricant such as, for example, a silicone grease to provide a self contained lubricant supply for the shaft engaged bearing surfaces.

At the upper end of the bore is formed an integral shaft sealing shoulder 24 of smaller diameter than the shaft to be sealingly engaged thereby. The shaft seal 24 renders the bushing 10 particularly useful as a sealed bushing for a reciprocal or rotatable shaft extending into a sealed container or environment. For example, in the application disclosed if sheet metal supporting structure 14 comprises a wall of a sealed container shaft sealing shoulder 24 would insure a fluid tight seal between opposite sides of the container wall and prevent fluid leakage along shaft 21.

The sleeve 10, in accordance with the invention, is provided with reinforcing means to prevent distortion of its longitudinal bore resulting from elastic deformation of the rubber material when compressed by the edges of opening 12 in sheet metal structure 14. This reinforcing means takes the form of an elongated metal sleeve 26 having a mean diameter intermediate the inner and outer diameter of the cylindrical portion 16 and imbedded within the sleeve 10 in coaxial relationship during the molding of sleeve 10. Sleeve 26 is provided with an outwardly extending flange 28 at the upper end thereof which is similarly imbedded within rubber flange 18 to reinforce the latter.

The metal sleeve 26 provides a two-fold reinforcing result; the tubular portion thereof reinforces rubber flange 18 to enable an end force to be applied to the latter to effect mounting of bushing 10 in the opening of supporting structure 12. Thus, flange 28 prevents excessive deformation of the rubber material upon initial installation of bushing 10 and the tubular portion of sleeve 26 prevents distortion of the bushing bore as a result of compression of the rubber material by the supporting structure 12, the rubber deformation as a result of mounting of bushing 10 being limited to that portion of cylindrical portion 16 on the outer side of sleeve 26, as shown in FIGURE 4.

The advantages of the reinforcing means will now be apparent. Rigidity is imparted to the bushing 10 without the use of inner and/or outer metal sleeves machined to close dimensional tolerances thus clearly reducing the fabrication costs of the bushing. The reinforcing sleeve 26 being contained within bushing 10 need not be manufactured to close manufacturing tolerances and, in fact, may be fabricated by a suitable low cost metal stamping process. The disclosed embodiment of the invention has particular utility in that it can be conveniently mounted in openings of thin-walled supporting structure such as shown in FIGURE 4 where the bushing is only engaged by the supporting opening over a small portion of its length. In such mounting substantial deformation of one portion of the bushing bore would normally occur without use of an inner or outer reinforcing sleeve. Additionally, the reinforcing means disclosed by permitting rubber to metal contact in a thin wall mounting of a bushing 10 as shown in FIGURE 4 eliminates the need for special mounting brackets commonly employed in connection with thin-wall supporting structures.

The disclosed bushing also possesses particular utility as a combined bushing and seal where it is desired to mount a rotatable or reciprocal shaft in a wall of a sealed container. Sealing shoulder 24 effectively prevents fluid leakage along a shaft supported by the bushing 10 and lubricant reservoirs 22 insure adequate shaft lubrication regardless of the environment within such a sealed container and establishes a lubricant film which augments the sealing action of the bushing.

It will be apparent to those skilled in the art that many changes may be made in the construction and arrangement of parts disclosed without departing from the scope of the invention as defined in the appended claims.

What is claimed and desired to be secured by United States Letters Patent is:

1. A rubber bushing to be force-fitted into an opening of a rigid supporting structure comprising: a rubber part of generally elongated tubular configuration having a central bore for receiving a cylindrical member therein and an outside diameter larger than that of the opening of the supporting structure, said rubber part being adapted for being placed into and retained in said opening by frictional engagement resulting from elastic deformation and compression of the rubber material of said part, a rigid cylindrical reinforcing member imbedded within said rubber part substantially parallel to the axis of elongation of said rubber part and effectively separating radial portions of said part to inhibit radial deformation in response to compression of the rubber material; one of the portions of said rubber part being arranged for disposition between the tubular member and the reinforcing member and the other portion between the reinforcing member and the supporting structure; one of said portions having a network of load-bearing ribs defining a plurality of cavities for permanently retaining a lubricant therein and adapted for sliding contact with one of the cylindrical members; an annular seal integral with said part provided at one end of said bore; and viscous lubricant located within said cavities between said ribs.

2. A rubber shaft bushing to be force fitted in an opening of a rigid supporting structure comprising: a rubber part of generally elongated tubular configuration having a central bore for receiving a tubular member therein and an outside diameter larger than that of the opening of the supporting structure, said rubber part being adapted for being placed into and retained in said opening by frictional engagement resulting from elastic deformation and compression of the rubber material of said part; said bore having a network of axially and radially extending raised ribs formed on the walls thereof to be engaged by the tubular member and to form a plurality of cavities for retaining lubricants therein and between the ends of said walls; a rigid reinforcing member imbedded within said rubber part substantially parallel to the axis of elongation of said rubber part to inhibit radial deformation in response to said compression of the rubber material; and said part being provided with an integral annular seal at one end of said bore.

3. A rubber bushing for retention in an opening of a supporting structure, comprising: a rubber part of generally elongated tubular configuration having a central longitudinal bore for receiving a tubular member therein and an outside diameter exceeding that of the opening of the supporting structure to retain the part in the opening of said structure by elastic deformation and radial compression thereof, said bore having a network of axially and radially extending raised ribs formed on the walls thereof to be engaged by the tubular member and to form cavities for retaining lubricants therein and between the ends of said wall; an integral rubber flange formed outwardly on one end of said rubber part for engagement with the supporting structure; a rigid reinforcing member formed of an at least partly cylindrical metal imbedded within said rubber part and extending substantially parallel to the axis of elongation of the rubber part to prevent deformation of the bore face thereof and including an integral metal flange imbedded within said rubber flange to impart rigidity to the latter.

4. A rubber shaft bushing as claimed in claim 3, wherein said part is provided with an integral shaft sealing shoulder at one end of said bore.

References Cited by the Examiner
UNITED STATES PATENTS

| | | | |
|---|---|---|---|
| 2,489,715 | 11/1949 | Mark et al. | 277—208 X |
| 2,729,482 | 1/1956 | Kosatka | 277—178 |
| 2,772,034 | 11/1956 | Richmond | 277—178 X |
| 2,839,340 | 6/1958 | Merchant | 308—26 |
| 2,936,933 | 5/1960 | Malec | 277—178 X |
| 3,101,205 | 8/1963 | Benham | 285—194 X |

SAMUEL ROTHBERG, *Primary Examiner.*

LAVERNE D. GEIGER, *Examiner.*